United States Patent
Kim et al.

(10) Patent No.: US 7,024,034 B2
(45) Date of Patent: Apr. 4, 2006

(54) COLOR TEMPERATURE CONVERSION SYSTEM AND METHOD USING THE SAME

(75) Inventors: Young-sun Kim, Suwon (KR); Bong-hwan Cho, Gyunggi-do (KR); Bong-soon Kang, Busan (KR); Doo-Il Hong, Busan (KR)

(73) Assignee: Samsung Electronics Co., Ltd., Gyungki-do (KR)

( * ) Notice: Subject to any disclaimer, the term of this patent is extended or adjusted under 35 U.S.C. 154(b) by 617 days.

(21) Appl. No.: 10/270,390

(22) Filed: Oct. 15, 2002

(65) Prior Publication Data

US 2003/0095138 A1 May 22, 2003

(30) Foreign Application Priority Data

Oct. 15, 2001 (KR) ................... 2001-63418

(51) Int. Cl.
*G06K 9/00* (2006.01)
(52) U.S. Cl. ................... 382/162; 382/167
(58) Field of Classification Search ........... 382/162, 382/163, 164, 165, 166, 167; 358/1.9, 518, 358/527, 501, 504, 533, 519, 528; 345/690
See application file for complete search history.

(56) References Cited

U.S. PATENT DOCUMENTS 5,502,580 A * 3/1996 Yoda et al. ................. 358/518
5,606,432 A * 2/1997 Ohtsuka et al. ............ 358/527
5,748,858 A * 5/1998 Ohtsuka et al. ............ 358/1.9

OTHER PUBLICATIONS

Chan et al., "Video CCD Based Portable Digital Still Camera", IEEE vol. 43, No. 3, Aug. 1995, pp. 455-459.*

* cited by examiner

*Primary Examiner*—Anh Hong Do
(74) *Attorney, Agent, or Firm*—Sughrue Mion, PLLC

(57) ABSTRACT

A color temperature conversion system and a method thereof are capable of converting the color temperature to the color temperature almost identical with the color temperature obtained by the Robertson algorithm. The color temperature conversion system has an XYZ conversion unit for converting an RGB signal of input video data into an XYZ value in a CIE coordinate system, a chroma calculating unit for calculating X and Y coordinate values of a pixel corresponding to the converted XYZ value, an offset compensate unit for compensating the X coordinate value calculated by the chroma calculating unit based on an X coordinate value difference and a Y coordinate value difference of a color temperature on a white point line of the CIE coordinate system and an actual color temperature of the video data, in the case the color temperature is calculated based on the calculated X coordinate value, a color temperature calculating unit for calculating the color temperature of the video data that is inputted based on the compensated X coordinate value, and a color temperature conversion unit for converting the color temperature calculated by the color temperature calculating unit into a predetermined color temperature and outputting the converted predetermined color temperature.

8 Claims, 8 Drawing Sheets

PRIOR ART

COLOR TEMPERATURE CONVERSION SYSTEM AND METHOD USING THE SAME

BACKGROUND OF THE INVENTION

1. Field of the Invention

The present invention relates to a color temperature conversion system and method thereof, and more particularly, to a color temperature conversion system for converting a color in a color display system and a method using the same. The present application is based on Korean Patent Application No. 2001-63418, filed Oct. 15, 2001, which is incorporated herein by reference.

2. Description of the Prior Art

When one looks at an object, the overall hue perceived by the viewer varies depending on characteristics of the illumination. For example, under an incandescent lamp, an object appears reddish, while in daylight, the same object appears more bluish than under the incandescent lamp. That means, the higher color temperature results in bluish colors, and the lower color temperature results in reddish colors. Since the color is closely related to the color temperature, the color temperature needs to be changed in order to change the color.

Color display systems are widely used in many devices for visually transmitting information to the viewer. Such devices include, for example, TVs, DTVs, thin film transistor (TFT) monitors, color printers, digital cameras, projectors, and mobile phones. Due to visual characteristics of the color display system, a correlated color temperature needs to be calculated accurately. The correlated color temperature of a light source which is measured in Kelvin units (K) is the temperature of a blackbody when the color of the light source is the same. In other words, the correlated color temperature is a wavelength of the light source represented by the Kelvin scale, a standard comparison measuring value.

Color models are used to classify colors, and also qualify colors in accordance with attributes like hue, saturation, chroma, lightness, and brightness. Also, the color models are used for matching, and at the same time the valuable resources for the subjects that have to handle color images on the video or the Web. The color models include a RGB model, a HSB/HSL model, a Munsell color system, and a CIE color model. The CIE color model is determined by the International Commission on Illumination, the organization for determining lighting standards. The CIE color model includes CIEXYZ, CIELUV, and CIELAB color models. The CIEXYZ color model uses positive tristimulus values, indicated as XYZ to express colors. The CIEXYZ color model uses a chroma diagram.

Conventionally, the color temperature is calculated by the Robertson algorithm that uses X and Y axes of the CIEXYZ color model. FIG. 1 is a flowchart for detecting the color temperature by using the Robertson algorithm, and FIG. 2 is a view illustrating the color temperature detecting method of FIG. 1. With reference to FIGS. 1 and 2, the color temperature detecting method using the Robertson algorithm will be described below.

The description of the conventional method for calculating color temperature is based on "Color Science: Concepts and Methods, Quantitative Data and Formulae, 2nd edition, pp. 225–229 & p. 828, 1982" by Gunter Wyszecki and W. S. Stiles. According to the conventional method for calculating color temperature, the color temperature of the light source is obtained by selecting an isotemperature line most adjacent to two-dimensional chroma coordinates corresponding to the light source. The isotemperature line is the line representing values of color temperature with respect to the selected light source. Accordingly, the two-dimensional chroma coordinates of the CIE 1931 diagram calculated from the RGB chroma coordinates of the input image, in other words, the XY chroma coordinates $(x_s, y_s)$ are inputted (step S110).

Then the XY chroma coordinates $(x_s, y_s)$ are converted into the two-dimensional chroma coordinates (hereinafter called UV chroma coordinates) $(U_s, V_s)$ of the CIE 1960 UCS diagram (step S120). The UV chroma coordinates $(U_s, V_s)$ are calculated by the following mathematical Equation 1:

$$U_s = \frac{4x_s}{-2x_s + 12y_s + 3}, V_s = \frac{6y_s}{-2x_s + 12y_s + 3} \quad \text{[Equation 1]}$$

After the UV chroma coordinates values $(U_s, V_s)$ are calculated from the UV chroma coordinates of the CIE 1960 UCS diagram, two isotemperature lines that are most adjacent to the UV chroma coordinates $(U_s, V_s)$ are selected (step S130).

Next, distances $(d_j, d_{j+1})$ between the selected the UV chroma coordinates $(U_s, V_s)$ and the two isotemperature lines are obtained (step S140). The distance $d_j$ is calculated by the following mathematical Equation 2:

$$d_j = \frac{(V_s - V_j) - t_j(U_s - U_j)}{(1 + t_j^2)^{1/2}} \quad \text{[Equation 2]}$$

where, the values $U_s$ and $V_s$ are UV chroma coordinates with respect to the inputted image.

The values $U_j$ and $V_j$ are UV chroma coordinates on the (j)th isotemperature line that has a slope of $t_j$.

As shown in FIG. 2, since the inputted chroma coordinates $(U_s, V_s)$ lie between the two isotemperature lines of A and B, the distance ratio $d_j/d_{j+1}$, calculated by the Equation 2, is always negative.

Next, from the two distance values $(d_j, d_{j+1})$ calculated in S140, a correlated color temperature $T_c$ is calculated (step S150). The correlated color temperature, corresponding to the inputted UV chroma coordinates $(U_s, V_s)$ can be obtained by two assumptions. One assumption is that a Planckian Locus (PL) between the two selected color temperatures $T_j, T_{j+1}$ can be replaced by a circular arc having a center at an intersection of the two selected isotemperature lines A and B. The other assumption is that the correlated color temperature is a linear function of distance along the circular arc. As a result, the following mathematical Equation is obtained:

$$T_c = \left[\frac{1}{T_j} + \frac{\theta_j}{\theta_j - \theta_{j+1}}\left(\frac{1}{T_{j+1}} - \frac{1}{T_j}\right)\right]^{-1} \quad \text{[Equation 3]}$$

where, $\theta_j$ and $\theta_{j+1}$ are angles between the correlated isotemperature lines meeting with the intersection of the isotemperature lines A and B, after passing through the two isotemperature lines $T_j, T_{j+1}$ and the UV coordinates $(U_s, V_s)$. With respect to the adjacent isotemperature line having small angles $\theta_j$ and $\theta_{j+1}$, with the Equations $\theta_j/\theta_{j+1} = \sin \theta_j/\sin \theta_{j+1}$, a fourth mathematical Equation is obtained as follows:

$$T_c = \left[\frac{1}{T_j} + \frac{d_j}{d_j - d_{j+1}}\left(\frac{1}{T_{j+1}} - \frac{1}{T_j}\right)\right]^{-1} \quad \text{[Equation 4]}$$

As described above, the conventional method for calculating the two-dimensional color temperature is complicated, and also requires a two-dimensional calculator using the UV chroma coordinates to build hardware. Taking the accuracy of the correlated color temperature $T_c$ into account during the establishment of the hardware, a square root calculator is also required to calculate the distance $d_j$. In addition, a comparator, a multiplier, and a divider, etc. are also required to determine a range of the input value. As a result, establishing the conventional method for detecting the two-dimensional color temperature at a hardware level has considerably low practicality and low utilization in terms of size and costs.

In order to overcome the above-mentioned problems, a color temperature conversion system has been suggested. The suggested color temperature conversion system calculates a color temperature with a one-dimensional chroma value, and converts a color temperature of the RGB of an input image into a color temperature of a desired RGB based on the calculated color temperature.

FIG. 3 is a view schematically showing a conventional color temperature conversion system. Referring to FIG. 3, the conventional color temperature conversion system includes an XYZ conversion unit 301, a pixel sort unit 303, a chroma calculate unit 305, a color temperature calculate unit 307, a conversion matrix calculate unit 309, a matrix calculate unit 311, and a target color temperature output unit 313.

The XYZ conversion unit 301 converts an RGB signal of input image data into an XYZ value of CIE coordinate system to detect a perception light source. The pixel sort unit 303 receives the XYZ value of the CIE coordinate system converted by the XYZ conversion unit 301, and eliminates pixels unnecessary for calculation of a light chroma $X_s$. After the unnecessary pixels are eliminated from the XYZ value of the CIE coordinate system, the XYZ value is transmitted to the chroma calculate unit 305. Based on the one-dimensional lighting chroma Xs inputted from the chroma calculate unit 305, the chroma calculate unit 307 calculates the color temperature of the input image data by the following equation:

1) If $4000K \leq T_c < 7000K$, [Equation 5]

$$X_D = -4.067\frac{10^9}{T_c^3} + 2.9679\frac{10^6}{T_c^2} + 0.09911\frac{10^3}{T_c} + 0.244063$$

2) If $7000K \leq T_c < 25000K$, $$X_D = -2.0064\frac{10^9}{T_c^3} + 1.9018\frac{10^6}{T_c^2} + 0.24748\frac{10^3}{T_c} + 0.237040$$

where $T_c$ is the color temperature of the inputted image data.

As shown in FIG. 4, the color temperature calculated by the one-dimensional chroma coordinate values are positioned on the white line of the CIE coordinate system, while the lighting chroma values of most image are positioned in near to the white point line. Accordingly, the color temperature calculated by the equation 5 merely has a difference with the color temperature detected by using the Robertson algorithm.

The conversion matrix calculate unit 309 calculates the conversion matrix to calculate a target color temperature. The conversion matrix is calculated by the following equation 6, by using the interrelation between the color temperature of the input image data and the target color temperature:

$$[TM] = [(XYZ)^{MT}]^{-1}[(XYZ)^{ME}] \quad \text{[Equation 6]}$$

where, [TM] is a matrix of the color temperature of the input image, $[(XYZ)^{MT}]^{-1}$ is a matrix of target color temperatures, and $[(XYZ)^{ME}]$ is a matrix of the input image color temperatures.

The matrix calculate unit 311 multiplies the conversion matrix calculated by the conversion matrix calculate unit 309 by a matrix for a conversion of the XYZ signal in the CIE coordinate system into a RGB value. By doing so, the conversion matrix with respect to the CIE coordinate system is converted into the conversion matrix with respect to the RGB. The conversion matrix, converted by the matrix calculate unit 311, is transmitted to the target color temperature output unit 313. The target color temperature output unit 313 multiplies the conversion matrix received from the matrix calculate unit 311 by the XYZ-converted matrix of the input data, to thereby output an RGB value of the target color temperature, i.e., output the image data of target color temperature. The output image data is expressed by the following equation 7:

$$\begin{bmatrix} R_t \\ G_t \\ B_t \end{bmatrix} = [TM]' \begin{bmatrix} X \\ Y \\ Z \end{bmatrix} \quad \text{[Equation 7]}$$

where, $$\begin{bmatrix} R_t \\ G_t \\ B_t \end{bmatrix}$$

are RGB elements according to the target color temperature, [TM]' is a conversion matrix, and $$\begin{bmatrix} X \\ Y \\ Z \end{bmatrix}$$

is tristimulus according to the input image color temperature.

As described above, considering a problem of hardware size, a general color temperature conversion system usually does not use the Robertson algorithm requiring the use of the lighting chorma values $X_s$ and $Y_s$, but uses the relational Equation between $X_s$ and the color temperature, i.e., equation 5, to obtain the color temperature. The color temperature, obtained as above, is positioned on the white point line of FIG. 4. Since the lighting chorma values are generally positioned near the white point line, there is no considerable difference between the color temperature detected by the Robertson algorithm and the color temperature detected by equation 5.

Using equation 5, however, suffers a drawback of inaccurate detection of color temperature when a monochrome color like green image is inputted, because the image of monochrome color pattern is spaced far beyond the white point line. Also, since the equations used in the color temperature conversion system have a limited range of color temperature of 4,000K~25,000K, an image of color temperature lower than the limited range has the fixed color temperature of 3,000K in the hardware (equation of 4,000K~7,000K is used if color temperature is in 3,000K~4,000K), and accordingly, a reddish image of relatively low color temperature is not detected precisely.

Due to the problems described above, the images being inputted are distorted, and the conventional color temperature conversion system does not convert the color temperature of the input image into a color temperature desired by a user.

SUMMARY OF THE INVENTION

The present invention has been made to overcome the above-mentioned drawbacks and problems of the prior art. Accordingly, it is an object of the present invention to provide a color temperature conversion system capable of not only detecting a color temperature of input images as precisely as obtained through the Robertson algorithm, but also detecting the color temperature in a wider range and converting the input images into images desired by a user, and a method thereof.

The above object is accomplished by a temperature conversion system according to the present invention, including an XYZ conversion unit for converting an RGB signal of input video data into an XYZ value in a CIE coordinate system; a chroma calculating unit for calculating X and Y coordinate values of a pixel corresponding to the converted XYZ value; an offset compensate unit for compensating the X coordinate value calculated by the chroma calculating unit based on an X coordinate value difference and a Y coordinate value difference of a color temperature on a white point line of the CIE coordinate system and an actual color temperature of the video data, in the case where the color temperature is calculated based on the calculated X coordinate value; a color temperature calculating unit for calculating the color temperature of the video data that is inputted based on the compensated X coordinate value; and a color temperature conversion unit for converting the color temperature calculated by the color temperature calculating unit into a predetermined color temperature and outputting the converted predetermined color temperature.

The chroma calculating unit calculates the X coordinate value ($X_c$) by, respectively, when $4000K \leq T \leq 25000K$, 1) $X_c = -3.0258469 \frac{10^9}{T^3} + 2.1070379 \frac{10^6}{T^2} + 0.2226347 \frac{10^3}{T} + 0.24039$ and when $1650K \leq T \leq 4000K$, 2) $X_c = -0.2661239 \frac{10^9}{T^3} - 0.2343580 \frac{10^6}{T^2} + 0.8776956 \frac{10^3}{T} + 0.179910,$ where T is the color temperature of the inputted video data.

The chroma calculating unit calculates the Y coordinate value ($Y_c$) of the color temperature positioned on the white point line by, respectively, 1) when $4000K < T < 25000K$ and $X_c \leq 0.38405$
$Y_c = 3.0817580(X_c)^3 - 5.8733867(X_c)2 + 3.75112997(X_c) - 0.37001483$.

2) when $2222K < T < 4000K$ and $X_c \leq 0.50338$,
$Y_c = -0.9549476(X_c)^3 - 1.37418593(X_c)^2 + 2.09137015(X_c) - 0.16748867$ 3) in other cases,
$Y_c = -1.1063814(X_c)^3 - 1.34811020(X_c)^2 + 2.18555832(X_c) - 0.20219683,$ wherein, the offsetting unit calculates the Y coordinate value difference between the calculated Y coordinate value ($Y_c$) on the white point line and the Y coordinate value of the inputted video data.

The offsetting unit calculates the X coordinate value difference by substituting the calculated Y coordinate value difference in $$\Delta X = \frac{f-e}{\Delta Y_{i+1} - \Delta Y_i}(\Delta Y - \Delta Y_i) + e,$$

where, $e = \frac{b-a}{|a_{i+1}|_x - |a_i|_x}(X - |a_i|_x) + a,$ $f = \frac{d-c}{|a_{i+1}|_x - |a_i|_x}(X - |a_i|_x) + c,$ a, b, c and d are points positioned in a maximum region and a minimum region within the ranges of calculated difference between the X and Y coordinate values, e and f are points where the color temperature calculated from the X coordinate value passes, $|a_{i+1}|_x$ is an X coordinate value of the video data inputted to an (a) point of (i+1)th order (i=1, 2, . . . ), $\Delta X$ is the X coordinate value difference and $\Delta Y$ is the Y coordinate value difference.

According to the present invention, a method of color temperature conversion includes the steps of: converting an RGB signal of inputted video data into an XYZ value on a CIE coordinate system; calculating an X coordinate value and a Y coordinate value of a pixel that corresponds to the converted XYZ value; compensating the X coordinate value calculated by a chroma calculating unit based on an X coordinate value difference and a Y coordinate value difference of the color temperature positioned on a white point line of the CIE coordinate system and an actual color temperature of the video data, in case the color temperature is calculated based on the X coordinate value; calculating the color temperature of the inputted video data based on the compensated X coordinate value; and converting the color temperature calculated by the color temperature calculating step into a predetermined color temperature and outputting the converted predetermined color temperature.

BRIEF DESCRIPTION OF THE DRAWINGS

The above-mentioned object and the feature of the present invention will be more apparent by describing the preferred embodiments of the present invention by referring to the appended drawings, in which.

DETAILED DESCRIPTION OF THE PREFERRED EMBODIMENTS

From now on, the present invention will be described in greater detail by referring to the appended drawings.

Figure 1:
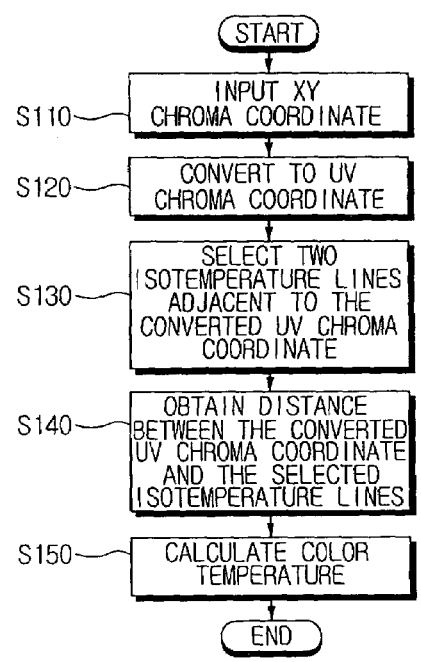
FIG. 1 is a flowchart illustrating a method for detecting a color temperature using the Robertson algorithm.
Figure 2:
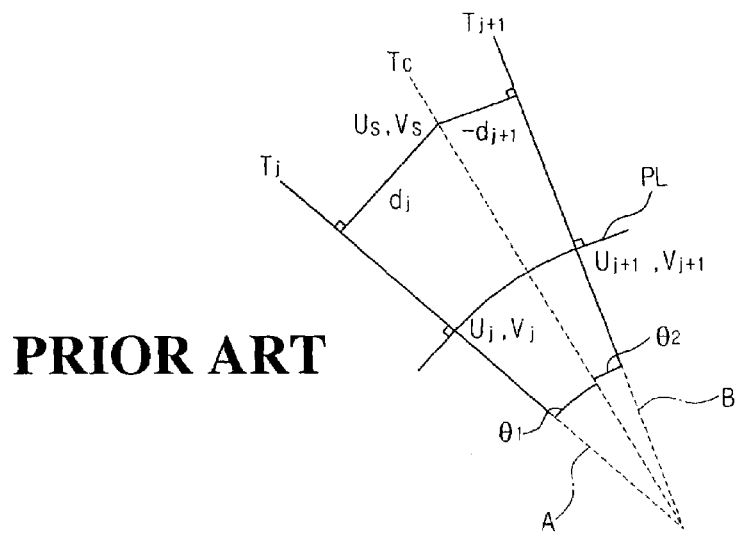
FIG. 2 is a view illustrating the color temperature detecting method of FIG. 1.
Figure 3:
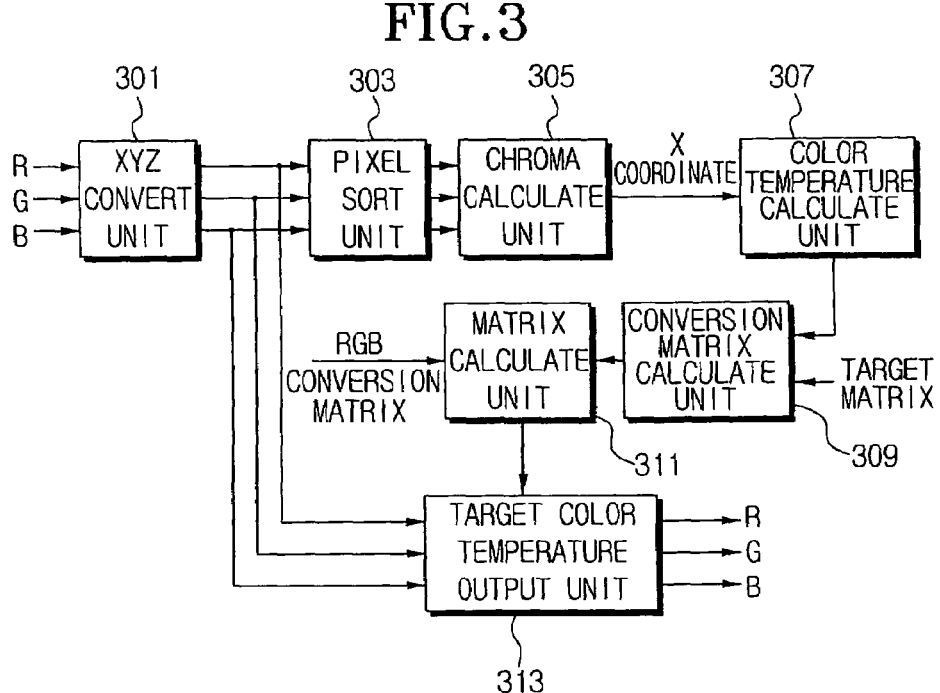
FIG. 3 is a block diagram schematically showing a conventional color temperature conversion system.
Figure 4:
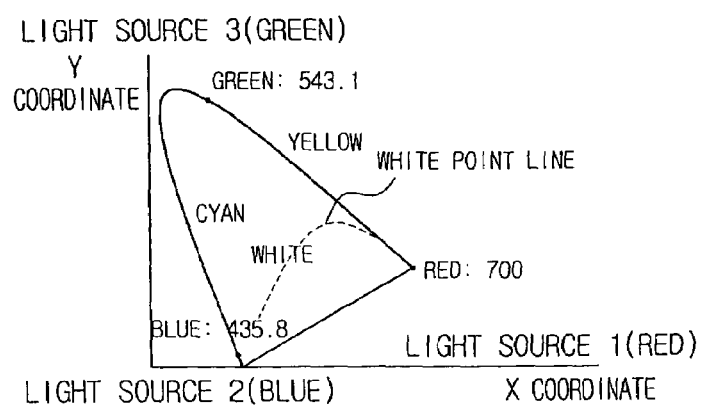
FIG. 4 is a view showing the CIE coordinate system being used in the color temperature calculation of FIG. 3.
Figure 5:
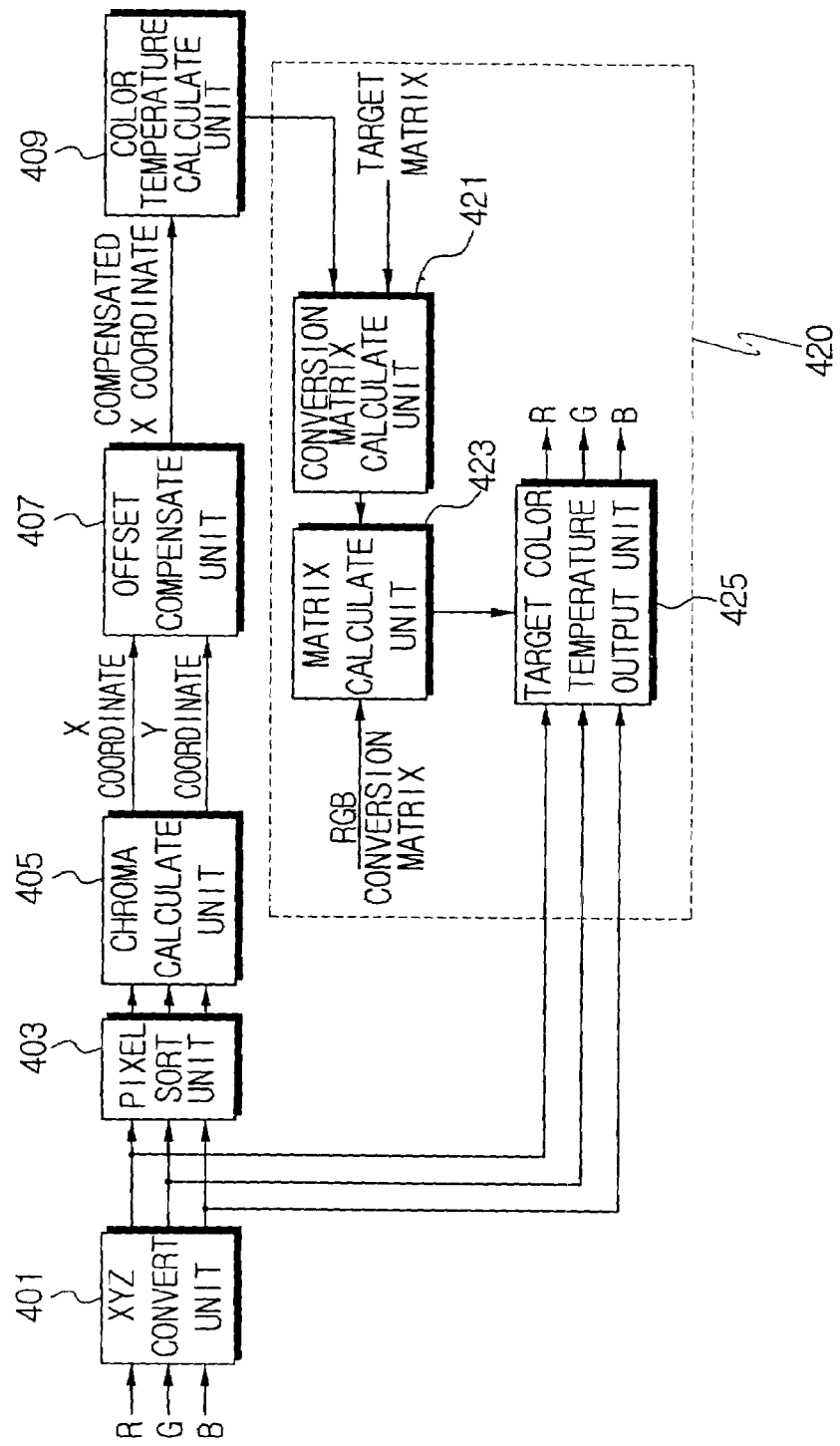
FIG. 5 is a block diagram schematically showing a color temperature conversion system according to the present invention.

FIG. 5 is a block diagram schematically showing a color temperature conversion system according to the present invention.

Referring to FIG. 5, the color temperature conversion system according to the present invention includes an XYZ convert unit 401, a pixel sort unit 403, a chroma calculate unit 405, an offset compensate unit 407, a color temperature calculate unit 409 and a color temperature convert unit 420. The color temperature convert unit 420 includes a conversion matrix calculate unit 421, a matrix calculate unit 423 and a target color temperature output unit 425.

The XYZ convert unit 401 converts an RGB signal of input image data into an XYZ value of a CIE coordinate system by calculating a 3×3 matrix. The pixel sort unit 403 receives the XYZ value of the CIE coordinate system, which is converted by the XYZ convert unit 401, and eliminates pixels by self-luminescence which are unnecessary for the lighting chroma calculation. The chroma calculate unit 405 receives the XYZ value absent unnecessary pixels and calculates X and Y coordinate values. In the case that the color temperature is calculated based on the X coordinate value calculated by the chroma calculate unit 405, the offset compensate unit 407 compensates the X coordinate value calculated by the chroma calculate unit 405, based on the X and Y coordinate value differences between the color temperature positioned on the white point line of the CIE coordinate system and the actual color temperature. The color temperature calculate unit 409 calculates the color temperature of inputted image data based on the X coordinate value compensated by the offset compensate unit 407. The conversion matrix calculate unit 421 calculates a first 3×3 conversion matrix for calculating a predetermined target color temperature. The matrix calculate unit 423 calculates a third 3×3 conversion matrix by multiplying a second 3×3 conversion matrix by the first 3×3 conversion matrix that is calculated by the conversion matrix calculate unit 421. The target color temperature output unit 425 calculates an RGB value of the target color temperature by calculating the third conversion matrix, which is calculated by the matrix calculate unit 423, with the XYZ value of the input image data.

Figure 6:
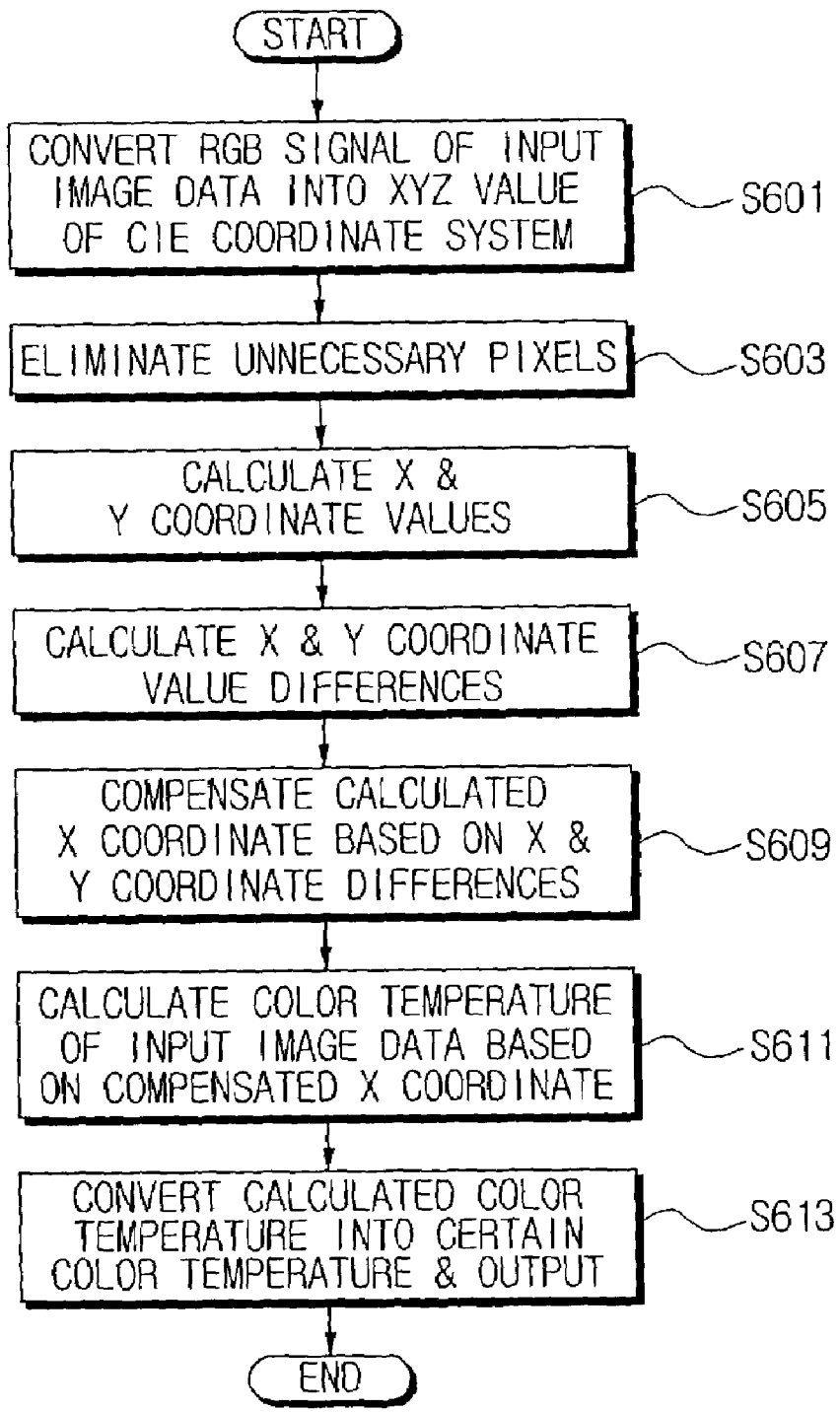
FIG. 6 is a flowchart showing the process of converting the color temperature by the system shown in FIG. 5.

FIG. 6 is a flowchart showing the process of converting color temperature by the system shown in FIG. 5. Referring to FIG. 6, the operation of the color temperature conversion system according to the present invention will be described in greater detail below.

First, the XYZ convert unit 401 converts the RGB signal of the input image data into the XYZ value of CIE coordinate system by calculating the 3×3 matrix (step S601). The converted XYZ value is transmitted to the pixel sort unit 403. Next, the pixel sort unit 403 receives the XYZ value of the CIE coordinate system, which is converted by the XYZ convert unit 401, and eliminates the pixels by self-luminescence, which are unnecessary for the lighting chroma calculation (step S603). After the unnecessary pixels are eliminated, the XYZ value is transmitted to the chroma calculate unit 405. Then the chroma calculate unit 405 receives the XYZ value, which is absent the unnecessary pixels, and calculates the X and Y coordinates values $X_c$ and $Y_c$ by the equations 8 and 9 (step S605):

[Equation 8]

when the color temperature (T) of the inputted video data is $4000K \leq T \leq 25000K$, $$1)\ X_c = -3.0258469\frac{10^9}{T^3} + 2.1070379\frac{10^6}{T^2} + 0.2226347\frac{10^3}{T} + 0.24039$$

and when the color temperature (T) of the inputted video data is $1650K \leq T \leq 4000K$, $$2)\ X_c = -0.2661239\frac{10^9}{T^3} - 0.2343580\frac{10^6}{T} + 0.179910.$$

[Equation 9]

1) when the color temperature (T) of the inputted video data is 4000K<T<25000K and $X_c \leq 0.38405$,
$Y_c = 3.0817580(X_c)^3 - 5.8733867(X_c)^2 + 3.75112997(X_c) - 0.37001483$.

2) when the color temperature (T) of the inputted video data is 2222K<T<4000K and $X_c \leq 0.50338$,
$Y_c = -0.9549476(X_c)^3 - 1.37418593(X_c)^2 + 2.09137015(X_c) - 0.16748867$ 3) in other cases,
$Y_c = -1.1063814(X_c)^3 - 1.34811020(X_c)^2 + 2.18555832(X_c) - 0.20219683$.

Figure 7:
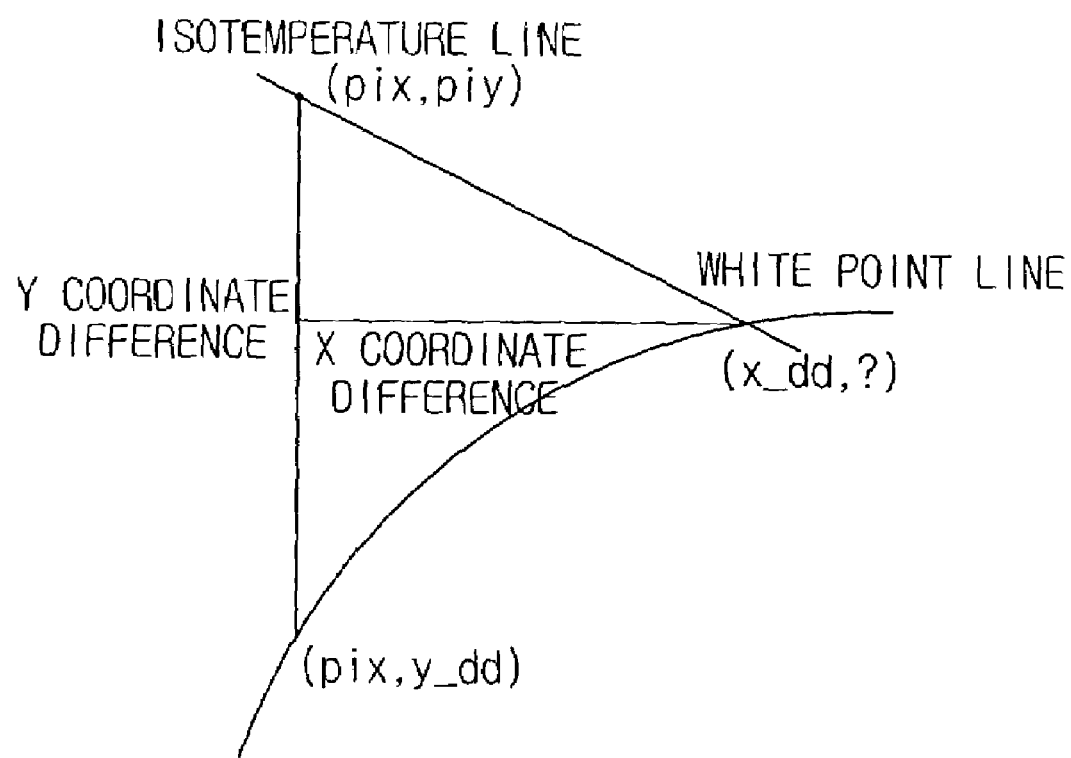
FIG. 7 is a view illustrating a method for calculating differences between X and Y values of the color temperature positioned on the white point line of a CIE coordinate system and an actual color temperature.

The offset compensate unit 407 calculates the Y coordinate value difference between the calculated Y coordinate value ($Y_c$) on the white point line and the Y coordinate value of the inputted video data (step S607). Referring to FIG. 7, obtaining the Y coordinate value ($Y_c$) on the white point line of the CIE coordinate system by using the X coordinate value of the inputted image data shows there is a difference—in other words, an error—corresponding to the Y coordinate value difference, between the $Y_c$ of the inputted data and the $Y_c$ on the white point line.

The offset compensate unit 407 calculates the X coordinate value difference by substituting the calculated Y coordinate value difference in the equation 10:

$$\Delta X = \frac{f - e}{\Delta Y_{i+1} - \Delta Y_i}(\Delta Y - \Delta Y_i) + e, \quad \text{[Equation 10]}$$

where, $$e = \frac{b - a}{|a_{i+1}|_X - |a_i|_X}(X - |a_i|_X) + a,$$

$$f = \frac{d - c}{|a_{i+1}|_X - |a_i|_X}(X - |a_i|_X) + c,$$

a, b, c and d are points positioned in a maximum region and a minimum region within the ranges of calculated difference between the X and Y coordinate values, e and f are points where the color temperature calculated from the X coordinate value passes, $|a_{i+1}|_X$ is an X coordinate value of the video data inputted to an (a) point of (i+1)th order (i=1, 2, ... ), $\Delta X$ is the X coordinate value difference and $\Delta Y$ is the Y coordinate value difference. The color temperature by the Robertson algorithm is obtained by using the lighting chroma values of the inputted image data, i.e., by using the X and Y coordinate values. Since the color temperature calculating method by the Robertson algorithm is the same as described above, the description thereof will be omitted.

Substituting the color temperature by the Robertson algorithm in the equation 5, the relational expression between the color temperature on the white point line of the CIE coordinate system and the X coordinate value, gives an X coordinate value (X_dd) of a point where the color temperature line, connecting the X and Y coordinate values of the inputted image data, intersects the white point line of the CIE coordinate system. The X coordinate value difference is calculated by obtaining a difference between the X coordinate value (X_dd) and the X coordinate value of the inputted image data.

Figure 8:
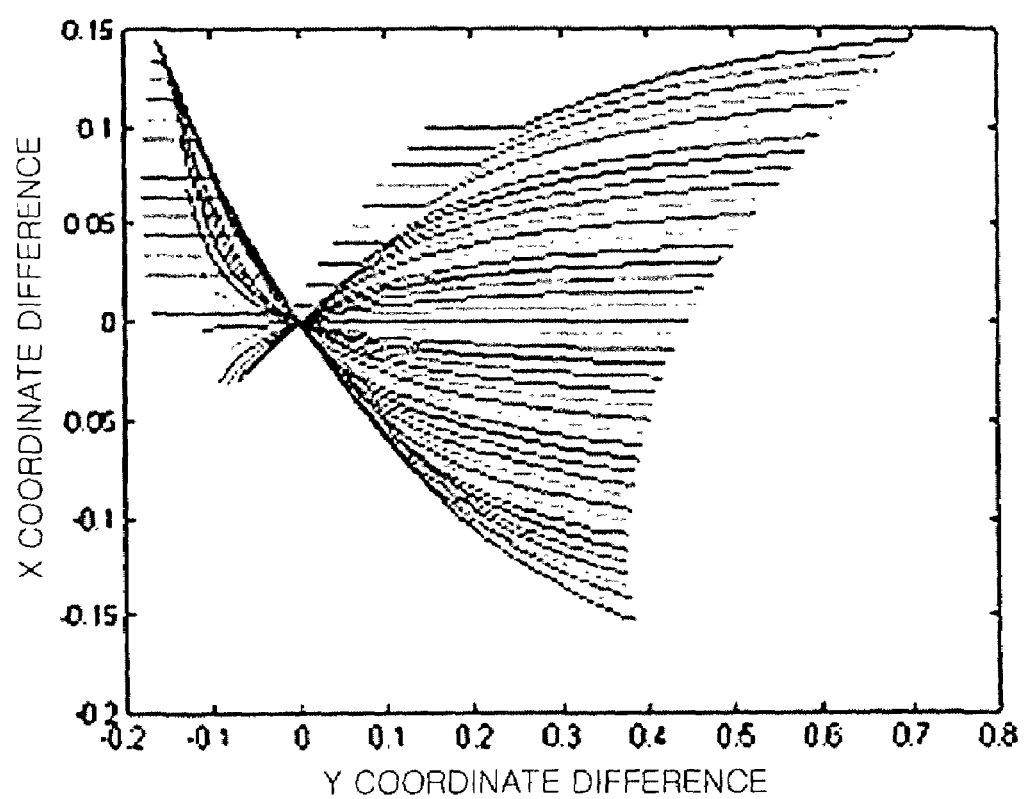
FIG. 8 is a view illustrating a relation between the X and Y value differences of FIG. 7.

FIG. 8 is a view illustrating the relation between the X and Y coordinate value differences of FIG. 7.

Figure 9:
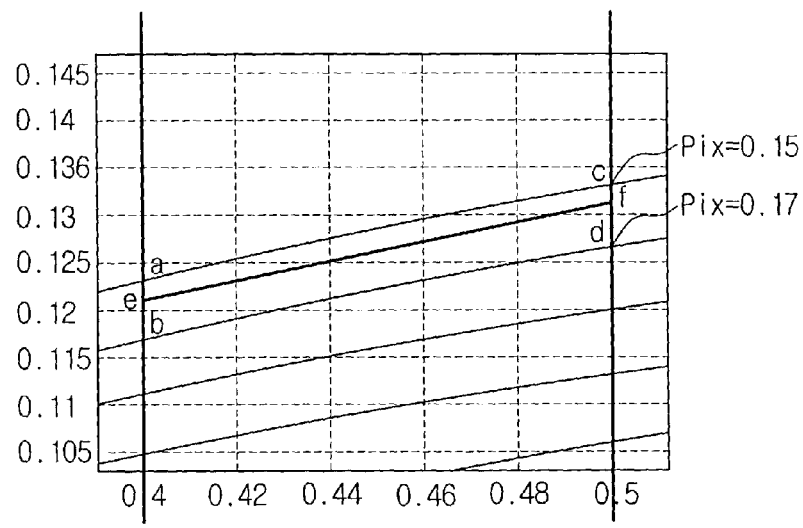
FIG. 9 is a view illustrating a method for compensating the X coordinate value, which is a lighting chroma value.
Figure 10:
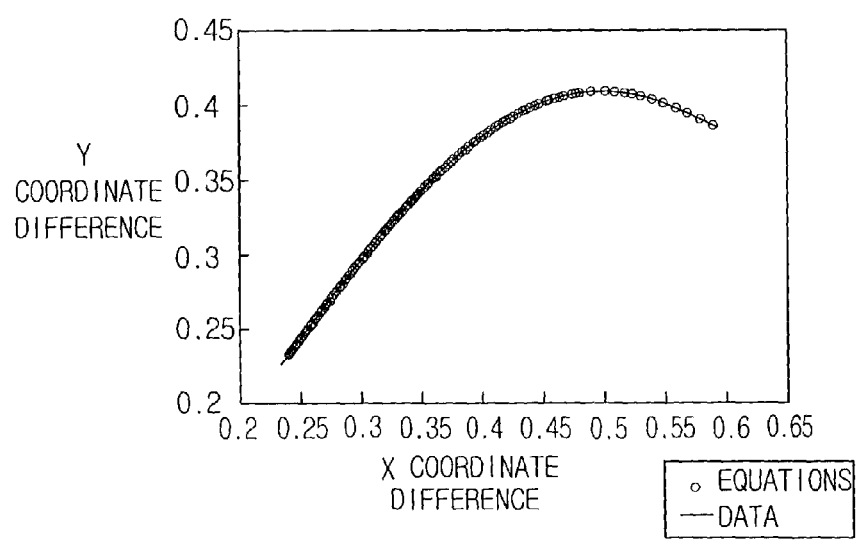
FIG. 10 is a graph illustrating equations obtained by the Robertson algorithm and by numerical analysis.

With the X coordinate value at the intervals of 0.15~0.58, and 0.02, the X coordinate value difference when the Y coordinate value difference is −0.125, −0.1, −0.075, −0.05, −0.025, 0, 0.025, 0.05, 0.075, 0.1, 0.15, 0.2, 0.3, 0.4, 0.5, and 0.6 is stored in a memory (not shown). Accordingly, if a lighting chroma value is inputted, four intersect points between the corresponding X coordinate value range and the Y coordinate value range are searched for, and extracted from the stored values. For example, if a lighting chroma value having an X coordinate value of 0.15~0.17 is inputted, and the calculated Y coordinate value difference is of 0.4~0.5, the X coordinate value differences, which are stored in the memory and corresponding to the four intersect points of the X coordinate values 0.15 and 0.17 and the Y coordinate values 0.4 and 0.5 are used in the above proportional Equation 10 to obtain the X coordinate value difference corresponding to the inputted lighting chroma value. That is, referring to FIG. 9, first, the value 'e' is obtained by using the stored values 'a' and 'b' and the equation 10. The value 'f' is also obtained in the same way. By substituting the 'e' and 'f' values in the equation 10, the X coordinate value difference to be compensated is finally obtained. By adding the X coordinate value to the X coordinate value difference, the compensated X coordinate value is obtained. By the above described way, when the color temperature is calculated based on the X coordinate value calculated by the chroma calculate unit 405, the offset compensate unit 407 compensates the X coordinate value based on the X coordinate value difference and the Y coordinate value difference between the color temperature positioned on the white point line of CIE coordinate system and the actual color temperature of the inputted image data (step S609). The color temperature calculate unit 409 calculates the color temperature of the inputted image data based on the X coordinate value compensated by the offset compensate unit 407 (step S611). Here, as shown in FIG. 10, the color temperature is obtained by using the equations 5 and 8, in order to avoid a discontinuity at a boundary point of 4000K (X coordinate value=0.38405), which occurrs when the equation 5 is used alone. It would already be noted that the way of using the equation 5 is almost identical to the way of using the equation 8. By applying the equations obtained by analysis to the color temperature calculate unit 409, the color temperature in the range of 1650K~25000K is obtained, with a greatly reduced distortion of color temperature. The conversion matrix calculate unit 421 calculates a first 3×3 conversion matrix for calculating a predetermined target color temperature. The matrix calculate unit 423 calculates a third 3×3 conversion matrix by multiplying a second 3×3 conversion matrix for converting the XYZ value of the CIE coordinate system into the RGB value by the first 3×3 conversion matrix calculated by the conversion matrix calculate unit 421. The target color temperature output unit 425 calculates the third conversion matrix, calculated by the matrix calculate unit 423, with the XYZ value of the inputted image data, to thereby output the RGB value of the target color temperature (step S613).

Table 1 below shows the simulation results by the color temperature conversion system according to the present invention, when a certain monochrome pattern, which is spaced farthest apart from the CIE coordinate system, is inputted.

TABLE 1

| Input Image Data | Result by Robertson Algorithm | Result by One-dimensional Method | Result by Present Invention |
|---|---|---|---|
| Red | 1667 | 1650 | 1650 |
| Green | 7245 | 25000 | 7254 |
| Blue | 25000 | 25000 | 25000 |
| Cyan | 25000 | 25000 | 25000 |
| Yellow | 3629 | 1812 | 3620 |
| Magenta | 1979 | 4773 | 2180 |

In the Table 1, the color temperatures by the Robertson algorithm, which is two-dimensional, are obtained in the calculation range of 1650K~25000K. As shown in the Table 1, the color temperatures obtained by the color temperature conversion system according to the present invention are close to the color temperatures obtained by the Robertson algorithm.

Figure 11:
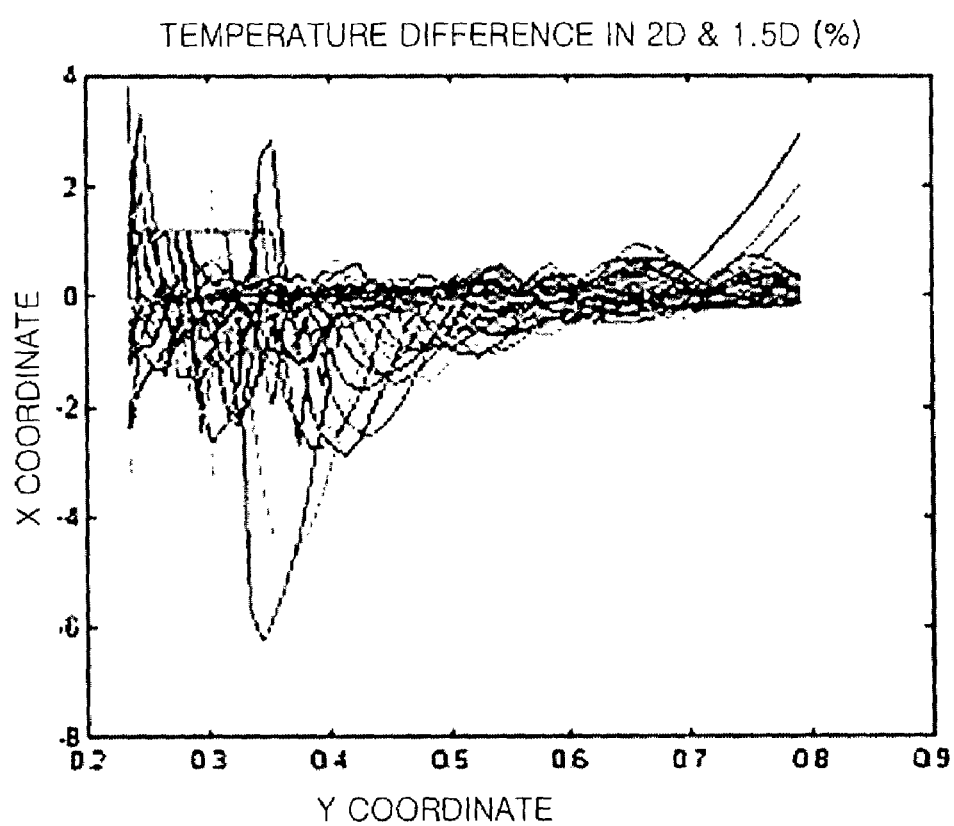
FIG. 11 is a view showing a difference between the color temperature calculated by the Robertson algorithm and a color temperature calculated by the system of FIG. 5.

FIG. 11 is a graph showing the differences in percentage terms between the color temperature obtained by the Robertson algorithm and the color temperature obtained by the color temperature conversion system according to the present invention, when the lighting chroma values, i.e., the X coordinate value and the Y coordinate value are inputted stepwise, respectively from 0.15 to 0.56 and from 0.23 to 0.8. Generally, the differences are approximately within 5%, which is as low as 3% below 4000K.

As described above, the color temperature conversion system according to the present invention is capable of not only detecting the color temperature of input images as precisely as the Robertson algorithm, but also detecting the color temperature in a wider range and converting the images into images desired by a user.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A color temperature conversion system, comprising:
an XYZ conversion unit for converting an RGB signal of input image data into an XYZ value in a CIE coordinate system;
a chroma calculating unit for calculating X and Y coordinate values of a pixel corresponding to the converted XYZ value;
an offset compensate unit for compensating the X coordinate value calculated by the chroma calculating unit based on an X coordinate value difference and a Y coordinate value difference of a color temperature on a white point line of the CIE coordinate system and an actual color temperature of the image data, when the color temperature is calculated based on the calculated X coordinate value;
a color temperature calculating unit for calculating the color temperature of the image data that is inputted based on the compensated X coordinate value; and
a color temperature conversion unit for converting the color temperature calculated by the color temperature calculating unit into a predetermined color temperature and outputting the converted predetermined color temperature.

2. The color temperature conversion system of claim 1, wherein the chroma calculating unit calculates the X coordinate value ($X_c$) by, respectively,
when $4000K \leq T \leq 25000K$, 1) $X_c = -3.0258469 \frac{10^9}{T^3} + 2.1070379 \frac{10^6}{T^2} + 0.2226347 \frac{10^3}{T} + 0.24039$ and when $1650K \leq T \leq 4000K$, 2) $X_c = -0.2661239 \frac{10^9}{T^3} - 0.234580 \frac{10^6}{T^2} + 0.8776956 \frac{10^3}{T} + 0.179910$, where T is the color temperature of the inputted image data.

3. The color temperature conversion system of claim 2, wherein the chroma calculating unit calculates the Y coordinate value ($Y_c$) of the color temperature positioned on the white point line by, respectively, 1) when $4000K < T < 25000K$ and $X_c \leq 0.38405$
$Y_c = 3.0817580(X_c)^3 - 5.8733867(X_c)^2 + 3.75112997(X_c) - 0.37001483$.

2) when $2222K < T < 4000K$ and $X_c \leq 0.50338$,
$Y_c = -0.9549476(X_c)^3 - 1.37418593(X_c)^2 + 2.09137015(X_c) - 0.16748867$ 3) in other cases,
$Y_c = -1.1063814(X_c)^3 - 1.34811020(X_c)^2 + 2.18555832(X_c) - 0.20219683$, wherein, the offsetting unit calculates the Y coordinate value difference between the calculated Y coordinate value ($Y_c$) on the white point line and the Y coordinate value of the inputted image data.

4. The color temperature conversion system of claim 3, wherein the offsetting unit calculates the X coordinate value difference by substituting the calculated Y coordinate value difference in $$\Delta X = \frac{f - e}{\Delta Y_{i+1} - \Delta Y_i}(\Delta Y - \Delta Y_i) + e,$$

where, $e = \frac{b - a}{|a_{i+1}|_X - |a_i|_X}(X - |a_i|_X) + a,$ $f = \frac{d - c}{|a_{i+1}|_X - |a_i|_X}(X - |a_i|_X) + c,$ a, b, c and d are points positioned in a maximum region and a minimum region within the ranges of calculated difference between the X and Y coordinate values,
e and f are points where the color temperature calculated from the X coordinate value passes,
$|a_{i+1}|_X$ is an X coordinate value of the image data inputted to an (a) point of (i+1)th order (i=1, 2, ... ),
$\Delta X$ is the X coordinate value difference and
$\Delta Y$ is the Y coordinate value difference.

5. A method of color temperature conversion, comprising the steps of:
converting an RGB signal of inputted image data into an XYZ value on a CIE coordinate system;
calculating an X coordinate value and a Y coordinate value of a pixel that corresponds to the converted XYZ value;
compensating the X coordinate value calculated by a chroma calculating unit based on an X coordinate value difference and a Y coordinate value difference of the color temperature positioned on a white point line of the CIE coordinate system and an actual color temperature of the image data, in case the color temperature is calculated based on the X coordinate value;
calculating the color temperature of the inputted image data based on the compensated X coordinate value; and
converting the color temperature calculated by the color temperature calculating step into a predetermined color temperature and outputting the converted predetermined color temperature.

6. The color temperature conversion method of claim 5, wherein the X coordinate value calculating step calculates the X coordinate value ($X_c$) by,
when $4000K \leq T \leq 25000K$, 1) $X_c = -3.0258469\dfrac{10^9}{T^3} + 2.1070379\dfrac{10^6}{T^2} + 0.2226347\dfrac{10^3}{T} + 0.24039$ and when $1650K \leq T \leq 4000K$, 2) $X_c = -0.2661239\dfrac{10^9}{T^3} - 0.2343580\dfrac{10^6}{T^2} + 0.8776956\dfrac{10^3}{T} + 0.179910$, where T is the color temperature of the inputted image data.

7. The color temperature conversion method of claim 6, wherein the Y coordinate value calculating step calculates the Y coordinate value ($Y_c$) of the color temperature positioned on the white point line by,
  1) when 4000K<T<25000K and $X_c \leq 0.38405$
    $Y_c = 3.0817580(X_c)^3 - 5.8733867(X_c)^2 + 3.75112997(X_c) - 0.37001483$.
  2) when 2222K<T<4000K and $X_c \leq 0.50338$,
    $Y_c = -0.9549476(X_c)^3 - 1.37418593(X_c)^2 + 2.09137015(X_c) - 0.16748867$
  3) in other cases,
    $Y_c = -1.1063814(X_c)^3 - 1.34811020(X_c)^2 + 2.18555832(X_c) - 0.20219683$, wherein, the offsetting unit calculates the Y coordinate value difference between the calculated Y coordinate value ($Y_c$) on the white point line and the Y coordinate value of the inputted image data.

8. The color temperature conversion method of claim 7, wherein the offsetting step calculates the X coordinate value difference by substituting the calculated Y coordinate value difference in $$\Delta X = \dfrac{f-e}{\Delta Y_{i+1} - \Delta Y_i}(\Delta Y - \Delta Y_i) + e,$$

where, $e = \dfrac{b-a}{|a_{i+1}|_X - |a_i|_X}(X - |a_i|_X) + a,$ $f = \dfrac{d-c}{|a_{i+1}|_X - |a_i|_X}(X - |a_i|_X) + c,$ a, b, c and d are points positioned in a maximum region and a minimum region within the ranges of calculated difference between the X and Y coordinate values, e and f are points where the color temperature calculated from the X coordinate value passes, $|a_{i+1}|_X$ is an X coordinate value of the image data inputted to an (a) point of (i+1)th order (i=1, 2, ... ), $\Delta X$ is the X coordinate value difference and $\Delta Y$ is the Y coordinate value difference.

* * * * *